US009526014B2

(12) United States Patent
Jung et al.

(10) Patent No.: US 9,526,014 B2
(45) Date of Patent: Dec. 20, 2016

(54) METHOD AND APPARATUS FOR REPORTING A LOGGED MEASUREMENT IN A WIRELESS COMMUNICATION SYSTEM

(75) Inventors: Sung Hoon Jung, Gyeongki-do (KR); Seung June Yi, Gyeongki-do (KR); Young Dae Lee, Gyeongki-do (KR); Sung Duck Chun, Gyeongki-do (KR); Sung Jun Park, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 499 days.

(21) Appl. No.: 13/816,287

(22) PCT Filed: Aug. 11, 2011

(86) PCT No.: PCT/KR2011/005894
§ 371 (c)(1),
(2), (4) Date: Feb. 11, 2013

(87) PCT Pub. No.: WO2012/021004
PCT Pub. Date: Feb. 16, 2012

(65) Prior Publication Data
US 2013/0137379 A1    May 30, 2013

Related U.S. Application Data

(60) Provisional application No. 61/391,664, filed on Oct. 10, 2010, provisional application No. 61/373,256, filed on Aug. 12, 2010.

(51) Int. Cl.
*H04B 17/00* (2015.01)
*H04W 24/00* (2009.01)
*H04W 24/10* (2009.01)

(52) U.S. Cl.
CPC .............. *H04W 24/00* (2013.01); *H04W 24/10* (2013.01)

(58) Field of Classification Search
CPC ............................. H04W 24/00; H04W 24/10
USPC ....................................................... 455/67.11
See application file for complete search history.

(56) References Cited

U.S. PATENT DOCUMENTS

| | | | | |
|---|---|---|---|---|
| 2007/0202888 | A1* | 8/2007 | Brachet | G01S 5/02 455/456.1 |
| 2011/0103318 | A1* | 5/2011 | Ekici | H04W 48/18 370/329 |
| 2011/0201279 | A1* | 8/2011 | Suzuki | H04W 24/10 455/67.11 |

OTHER PUBLICATIONS

Narayanan et al., "Using History to Improve Mobile Application Adaptation," Third IEEE Workshop on Mobile Computing Systems and Applications, 31-40 (2000).
Zhang et al., "Intrusion Detection in Wireless Ad Hoc Networks," The 6th Annual International Conference on Mobile Computing and Networking, Bostom, MA: 275-283 (Aug. 2000).

(Continued)

*Primary Examiner* — Wesley Kim
*Assistant Examiner* — Raj Chakraborty
(74) *Attorney, Agent, or Firm* — Morgan, Lewis & Bockius LLP

(57) ABSTRACT

The present invention relates to a method and apparatus for performing a logged measurement in a wireless communication system. A terminal receives a measurement configuration and a terminal selection parameter from a base station. The terminal determines whether or not to apply the measurement configuration based on the terminal selection parameter. If the measurement configuration is determined to be applied, the terminal logs a measurement based on the measurement configuration.

11 Claims, 11 Drawing Sheets

(56) References Cited

OTHER PUBLICATIONS

International Search Report issued in corresponding International Application No. PCT/KR2011/005894 dated Mar. 28, 2012.
Office Action issued in counterpart Korean Patent Application No. 10-2013-7003208 dated Apr. 17, 2014.
3GPP TS 37.320 v0.7.0, Jun. 2010. 3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10).
LG Electronics Inc., "Validity of MDT log after logging duration timer expiry," 3GPP TSG-RAN WG2 #70bis, R2-104003, Jun. 28-Jul. 2, 2010.

\* cited by examiner

METHOD AND APPARATUS FOR REPORTING A LOGGED MEASUREMENT IN A WIRELESS COMMUNICATION SYSTEM

BACKGROUND OF THE INVENTION

1. Field of the Invention

The present invention relates to wireless communication and more specifically to a method and apparatus of reporting measurement logged in a wireless communication system.

2. Related Art

3GPP (3$^{rd}$ generation Partnership Project) LTE (Long Term Evolution), which is an advanced version of UMTS (Universal Mobile Telecommunications System), is not being introduced as 3GPP release 8. 3GPP LTE uses OFDMA(orthogonal frequency division multiple access) on downlink and SC-FDMA(Single Carrier-frequency division multiple access) on uplink. 3GPP LTE adopts MIMO (Multiple Input Multiple Output) having a maximum of 4 antennas. Recently, 3GPP LTE-A (LTE-advanced) which is an advanced version of 3GPP LTE is now in discussion.

MDT (Minimization of Driving Tests) is for service providers to perform a test by using a terminal rather than a vehicle for the purpose of coverage optimization. Coverage varies depending on the position of a base station, arrangement of adjacent buildings, and a user's usage environment. Accordingly, service providers need to conduct a periodic driving test which requires high costs and resources. In MDT, a service provider measures coverage using a terminal.

MDTs may be categorized into logged MDTs and immediate MDTs. In the logged MDT, a terminal performs MDT measurement and transfers a logged measurement to a network at a specific time. In the immediate MDT, a terminal performs MDT measurement and when a condition is met, then transfers the measurement to a network. The logged MDT carries out MDT measurement in an RRC idle mode while the immediate MDT does in the RRC connection mode.

A user equipment performs logging irrespective of whether what is currently being measured is essential. As a result, duplicate log information may be included in the log stored in the user equipment. Due to such duplicate information, the size of the logged measurement increases, and wireless resources used for reporting the logged measurement and the memory may be inefficiently used.

SUMMARY OF THE INVENTION

The present invention provides a method and apparatus that selectively logs measurement in a wireless communication system.

The present invention provides a method and apparatus that reports measurement selectively logged in a wireless communication system.

In an aspect, a method for reporting a logged measurement in a wireless communication system is provided. The method includes receiving, by a user equipment, a measurement configuration, storing, by the user equipment, a logged measurement by logging measurements based on the measurement configuration, and reporting, by the user equipment, the logged measurement to a base station. The logged measurement includes one or more log entries, and at least one of items in each log entry is selectively logged.

Each log entry may include at least one of a logging location, a logging time, a serving cell identifier, a serving cell measurement result and a neighboring cell measurement result.

In another aspect, a wireless device configured for reporting a logged measurement in a wireless communication system is provided. The wireless device includes a radio frequency unit configured to transmit and receive a radio signal, and a processor operably connected to the RF unit and configured to receive a measurement configuration, store a logged measurement by logging measurements based on the measurement configuration, and report the logged measurement to a base station. The logged measurement includes one or more log entries, and at least one of items in each log entry is selectively logged.

A user equipment cam report information meaningful or necessary for a network among logging targets and does not report or log information that is not meaningful or necessary for the network. The memory necessary for storing logged measurement may be reduced. Further, the amount of radio resources necessary for transmitting logged measurement may be decreased.

DESCRIPTION OF EXEMPLARY EMBODIMENTS

Figure 1:
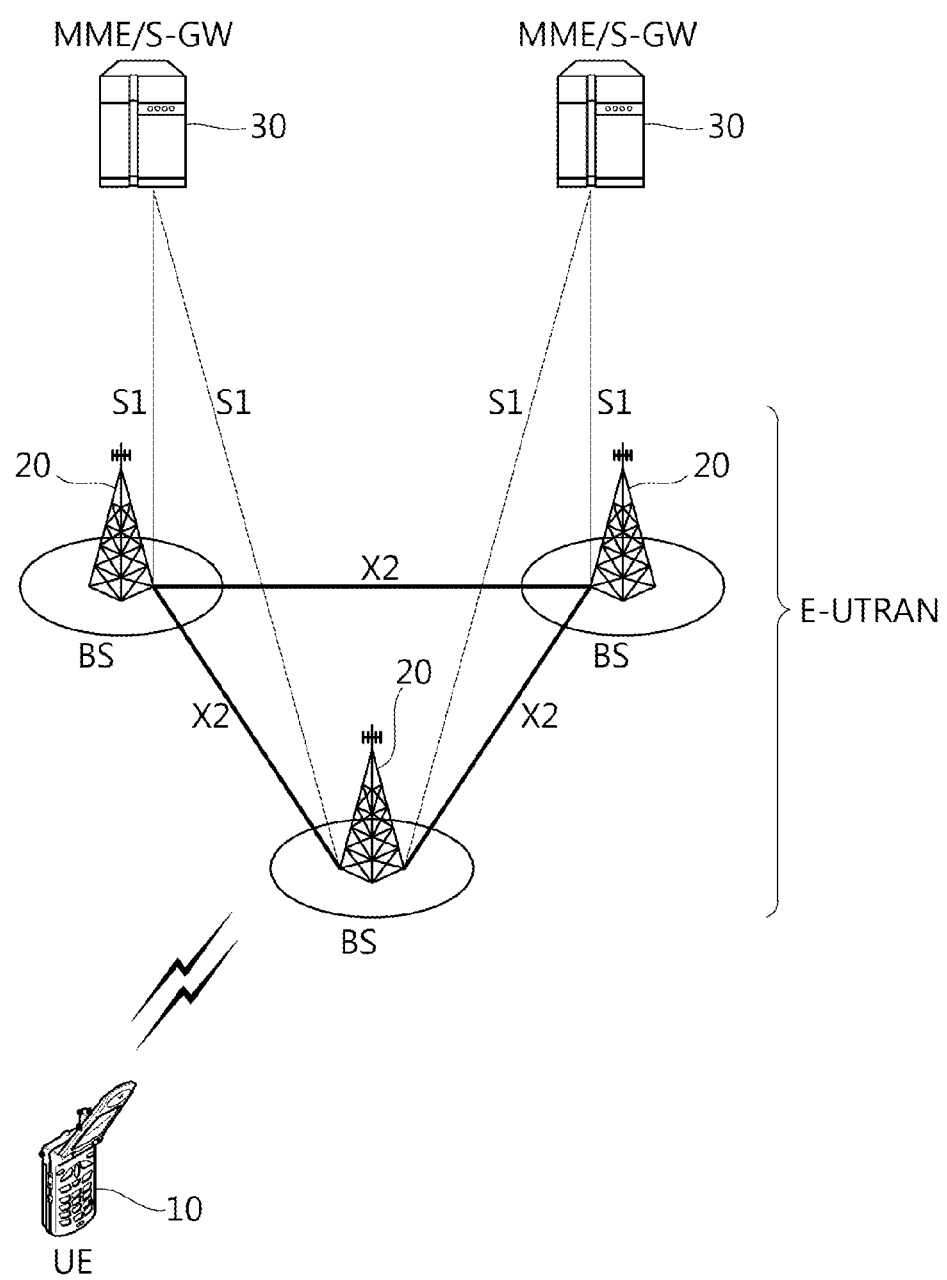
FIG. 1 illustrates a wireless communication system according to the present invention.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
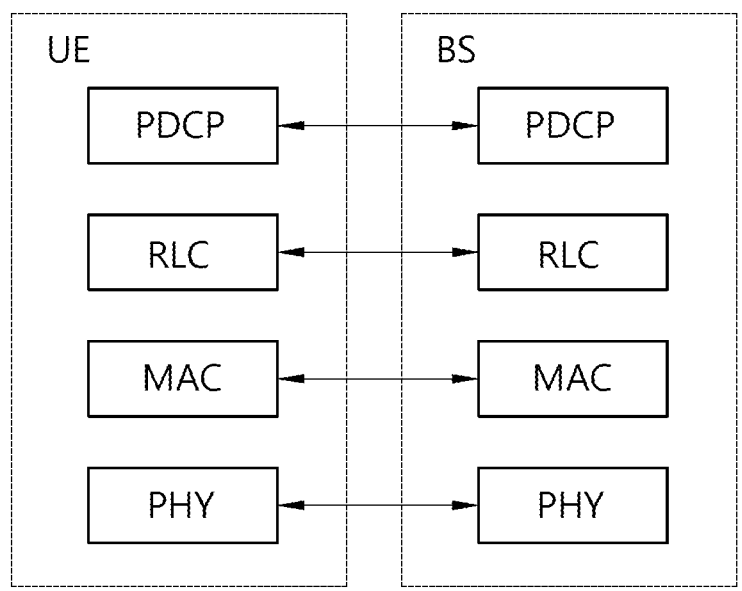
FIG. 2 is a block diagram illustrating a radio protocol architecture for a user plane.
Figure 3:
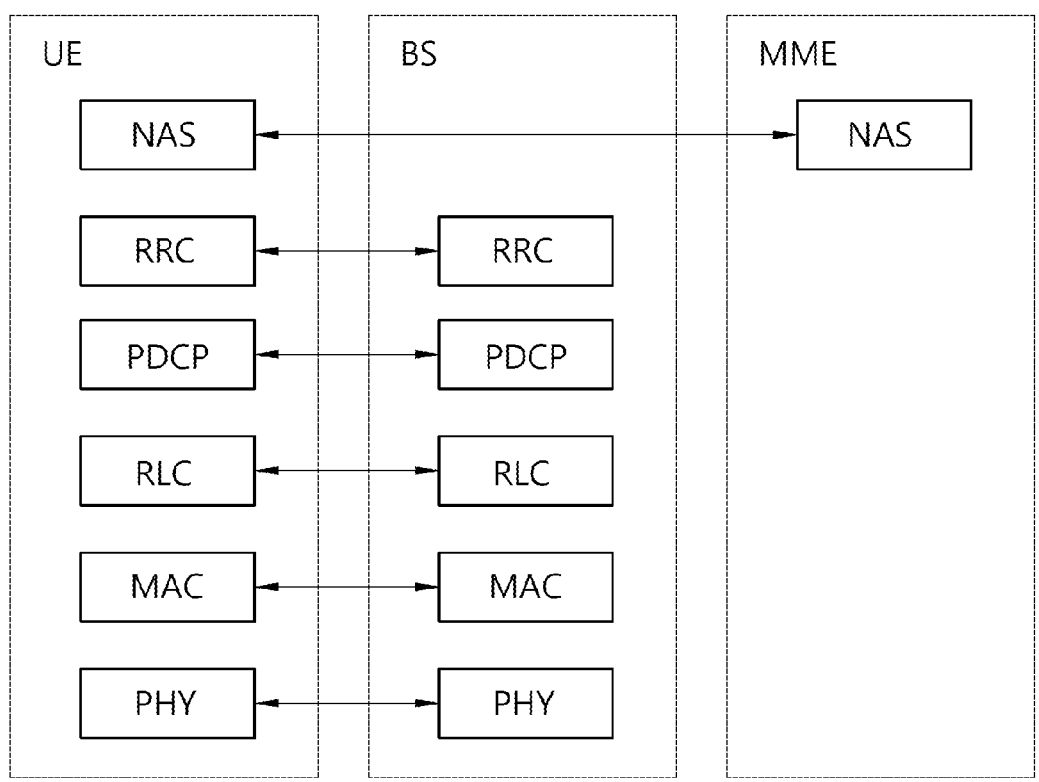
FIG. 3 is a block diagram illustrating a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

The service type provided by a cell can be classified as follows.

1) Acceptable cell: This cell serves a UE with a limited service. This cell is not barred from the perspective of the UE, and satisfies a cell selection criterion of the UE.

2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.

3) Barred cell: Information indicating that a cell is a barred cell is broadcast in this cell by using the system information.

4) Reserved cell: Information indicating that a cell is a reserved cell is broadcast in this cell by using the system information.

Next, procedures for measurements and measurement reports will be described in detail.

It is necessary for a wireless communication system to support mobility of a UE. Therefore, the UE persistently measures quality of a serving cell providing a current service and quality of a neighbor cell. The UE reports measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (e.g., a global cell identity) of the specific cell, location identification information indicating a location of the specific cell (e.g., a tracking area code), and/or other cell information (e.g., whether it is a member of a closed subscriber group (CSG) cell).

While moving, if the UE determines that quality of a specific region is significantly poor, the UE may report measurement result and location information on the poor cell to the network. The network may attempt to optimize the network on the basis of the measurement result reported from UEs which assist the network operation.

In a wireless communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports measurement result to the network, so as to achieve the purpose of the measurement result.

Service providers may operate networks by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report measurement result to the network.

When the UE supports measurement on a heterogeneous network, measurement on a cell of the heterogeneous network may be performed according to a configuration of a BS. Such measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Hereinafter, by referring to the 3GPP TS 36.304 V8.8.0 (2009-12) "User Equipment (UE) procedures in idle mode (Release 8)", a method and procedure for selecting a cell by a UE will be described in detail.

After a UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called cell reselection. A basic object of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority in the first place than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The steps for cell reselection are as follows.

First, A UE receives from a BS parameters for cell reselection.

Second, the UE measures quality of a serving cell and a neighboring cell for cell reselection.

Third, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g., cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 as shown:

$$Rs = Q\text{meas},s + Q\text{hyst}, \quad Rn = Q\text{meas},n - Q\text{offset} \quad \text{[Equation 1]}$$

where Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranging criterion Rn of the neighboring cell are not much different from each other and constantly vary, ranking orders of the serving cell and the neighboring cell may change frequently. Thus, the serving cell and the neighboring cell may be reselected alternately while changing their ranking orders too often. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as most important factor when performing the cell reselection. If a reselected cell is not a suitable cell, the UE excludes the reselected cell or a frequency of the reselected cell from targets of the cell reselection.

Figure 4:
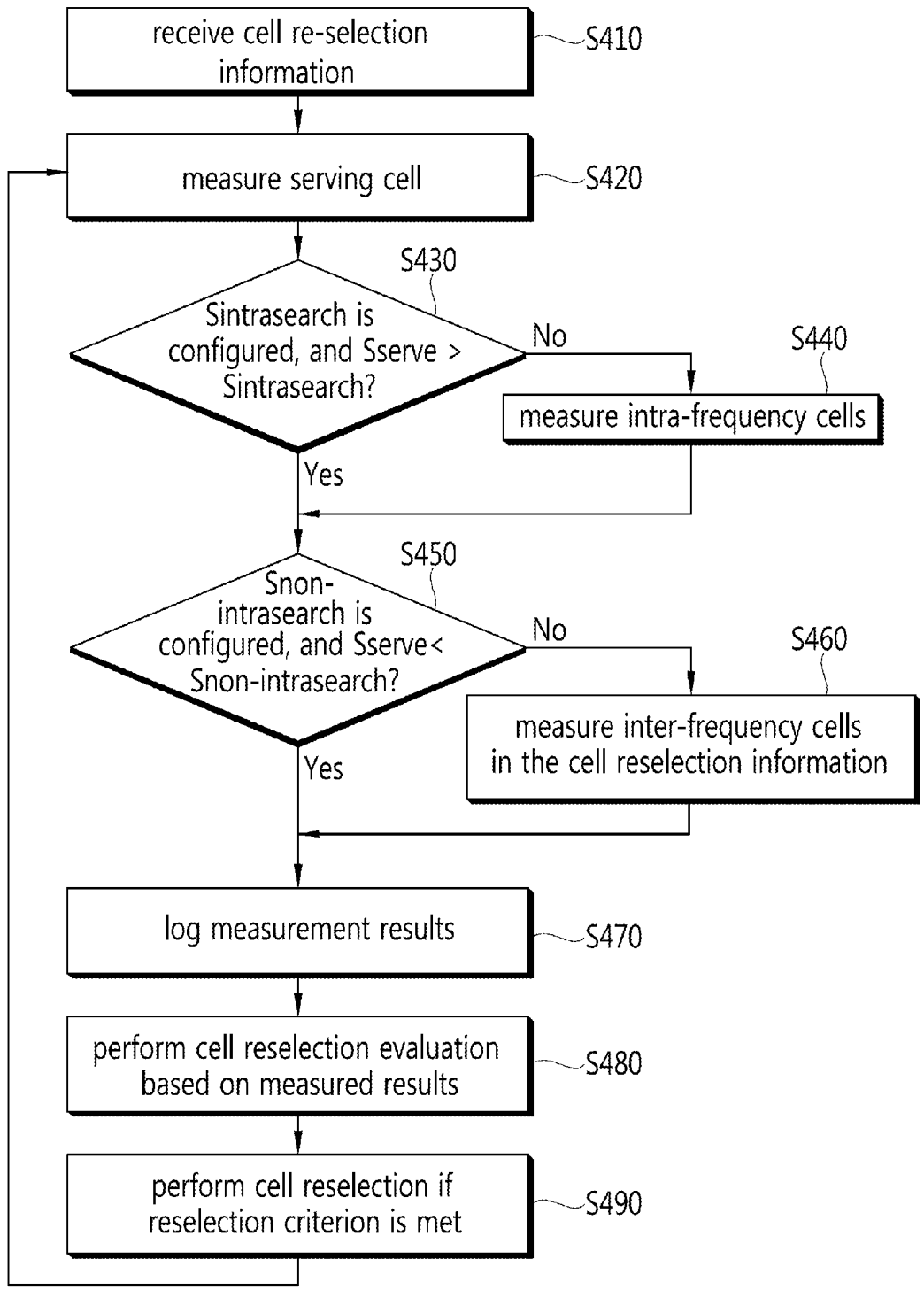
FIG. 4 is a flowchart illustrating a measurement method of a terminal

FIG. 4 is a flowchart showing measurement method of a UE.

A UE measures neighbor cells in order to know whether there is a neighbor cell better than a serving cell and to access to the cell if such a neighbor cell exists. However, when the neighbor cells are measured persistently, it may cause power consumption of the UE. Therefore, if the serving cell has sufficiently good quality, measurement on the neighbor cells is skipped if possible so as to reduce power consumption of the UE.

The UE receives cell reselection information from a BS (step S410). The cell reselection information may include two thresholds, i.e., Sintrasearch and Snon-intrasearch.

The UE measures the serving cell (step S420). Measurement result of the serving cell is denoted by Sserve.

The UE compares Sserve and Sintrasearch (step S430). If Sserve is less than Sintrasearch, the UE performs intra-frequency measurement (step S440). Otherwise, if Sserve is greater than Sintrasearch, the UE can skip measurement on neighbor cells having the same frequency as the serving cell.

If the cell reselection information does not include Sintrasearch, the UE cannot skip the measurement on the neighbor cells having the same frequency as the serving cell.

The UE compares Sserve and Snon-intrasearch (step S450). If Sserve is greater than Snon-intrasearch, the UE performs inter-frequency measurement (step S460). That is, if the serving cell has better quality than Snon-intrasearch, the UE can skip measurement on neighbor cells having a different frequency from the serving cell.

If the cell reselection information does not include Snon-intrasearch, the UE cannot skip the measurement on the neighbor cells having a different frequency from the serving cell.

The UE logs the measurement result (step S470). The UE performs cell reselection evaluation with all available measurement results (step S480). If a reselection criterion is met, the UE performs cell reselection (step S490).

Now, minimization of driving tests (MDT) will be described.

The MDT is a test performed by service providers for coverage optimization by using a UE instead of using an automobile. A coverage varies depending on a location of a BS, deployment of buildings nearby, a user's usage environment, etc. Therefore, it is required for the service providers to periodically perform driving tests, and a lot of costs and resources are consumed. The UE performs measurements and send the results to the service provider so that the service provider utilizes MDT for network optimization.

The MDT can be classified into a logged MDT and an immediate MDT. According to the logged MDT, after performing the MDT measurement, the UE delivers a logged measurement to a network available at a time of a reporting condition. According to the immediate MDT, after performing the MDT measurement, the UE delivers the measurement to the network at points in time when a configured reporting condition is satisfied. The logged MDT performs the MDT measurement in an RRC idle mode, but the immediate MDT performs the MDT measurement in an RRC connected mode.

Figure 5:
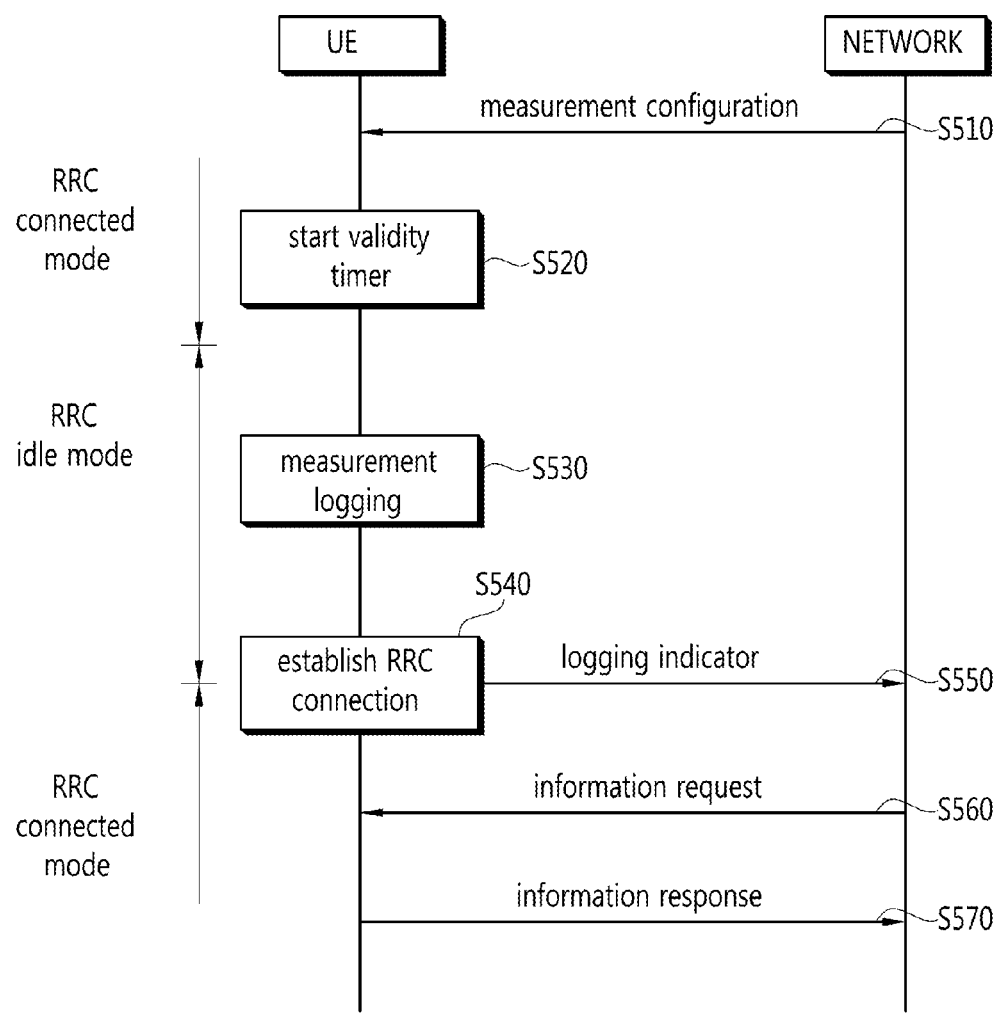
FIG. 5 illustrates an example of a process of performing MDT.

FIG. 5 illustrates an example of a process of performing MDT.

The UE receives a measurement configuration from the network (S510). The measurement configuration may include an MDT configuration for MDT measurement. Despite the transition from the RRC connection mode to the RRC idle mode, the MDT configuration is maintained, and accordingly, the MDT measurement result is also maintained.

The measurement configuration may include at least one of a logging interval, a reference time, an area configuration, and a logging duration.

The logging interval denotes periodicity for storing a measurement result. The MDT measurement is carried out at every logging interval.

The reference time is used to provide a reference time when the UE sends logged measurement. The UE logs a relative time with respect to a time that the measurement result is obtained from the reference time.

The area configuration denotes a logging area where the UE is requested to perform logging. The logging area may be represented as at least one of a cell list, a tracking area list, and a location area list. Once the logging area is set, the UE terminates logging when departing from the logging area.

Only when camping on the RAT where MDT configuration is received, the UE performs logging, and terminates logging on other RATs. However, the UE may log cell information of a RAT other than the RAT which the UE camps on.

Figure 6:
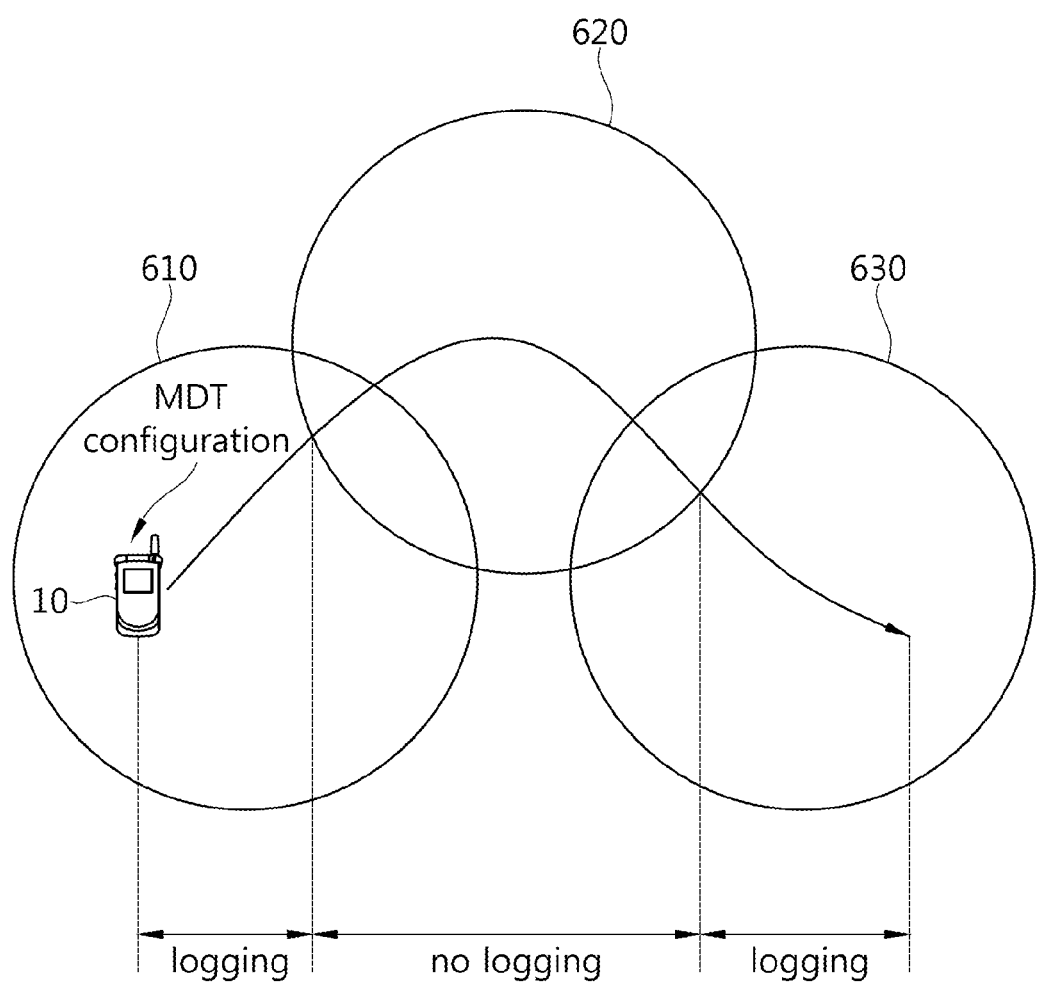
FIG. 6 illustrates an example of MDT measurement depending on a change in RAT.

FIG. 6 illustrates an example of MDT measurement according to a change in RAT.

A first area 610 and a third area 630 are E-UTRAN areas, and a second area 620 is a UTRAN area. The MDT configuration is received from the E-UTRAN. The UE stops MDT measurement upon entry into the second area 620.

Referring back to FIG. 5, the logging duration denotes a validity timer value. The validity timer refers to lifetime of a measurement configuration.

As the measurement configuration is received, the validity timer is started (S520).

While the validity timer is running, the UE which is in the RRC idle mode logs measurement based on the measurement configuration and collects logged measurement (S530).

Figure 7:
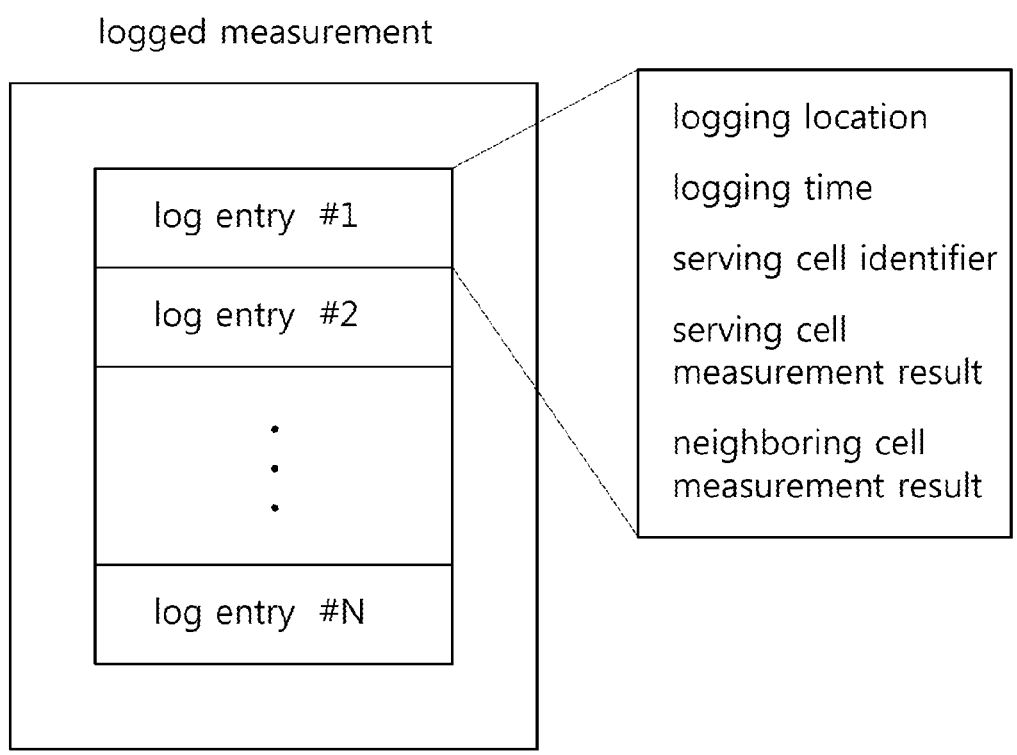
FIG. 7 illustrates an example of logged measurement.

FIG. 7 illustrates an example of logged measurement.

The logged measurement includes one or more log entries.

The log entry includes a logging location, a logging time, a serving cell identifier, a serving cell measurement result, and a neighboring cell measurement result.

The logging location denotes a location where the UE performed the measurement. The logging time denotes a time that the UE performed the measurement. Pieces of information logged at different times, respectively, are stored in different log entries, respectively.

The serving cell identifier may include a cell identifier at level 3—that is called GCI (Global Cell Identity). The GCI is an aggregation of PCI (Physical Cell Identity) and PLMN identifier.

The serving cell measurement result and the neighboring cell measurement result are quality/strength values measured on a serving cell and a neighboring cell, respectively, and may use values well-known to those skilled in the art, such as RSRP(Reference Signal Received Power), RSRQ (Reference Signal Received Quality), RSCP(received signal code power), Ec/No.

The UE may perform logging by analyzing indexes related to the UE's performance other than the wireless environment. For example, the indexes may include a throughput and an erroneous transmission/reception rate.

Turning back to FIG. 5, the UE enters into the RRC connection mode by establishing or reestablishing an RRC connection with the base station (S540).

As the UE transits from the RRC idle mode to the RRC connection mode, a logging indicator is sent to the network (S550). The logging indicator may be an indicator that indicates availability of the logged measurement. The UE performs measurement in the RRC idle mode and informs the network whether there is logged measurement as the UE enters into the RRC connection mode.

The UE may send the logging indicator to the network when the RRC connection is established, re-established, or reconfigured.

Aware that there is logged measurement based on the logging indicator, the network sends an information request to the UE to request to report the logged measurement (S560).

The UE sends an information response including the logged measurement to the network (S570).

While the validity timer is in operation, the UE in the RRC idle mode logs measurement based on the measurement configuration. If the validity timer expires, the UE discards the measurement configuration. This means that the UE removes the measurement configuration and terminates the measurement. When the validity timer expires, the measurement configuration is discarded, but the logged measurement may be maintained. The logged measurement may last a predetermined time (e.g., 48 hours) after the validity timer expires.

According to the prior art, the UE performs logging irrespective of whether what is currently being measured is inevitable. As a result, duplicate information may be included in the log stored in the UE. Due to the duplicate information, the size of the logged measurement increases, and wireless resources used for reporting the logged measurement and the memory of the UE may be inefficiently used.

According to the suggested embodiments, each item included in the log entry may selectively be logged.

Figure 8:
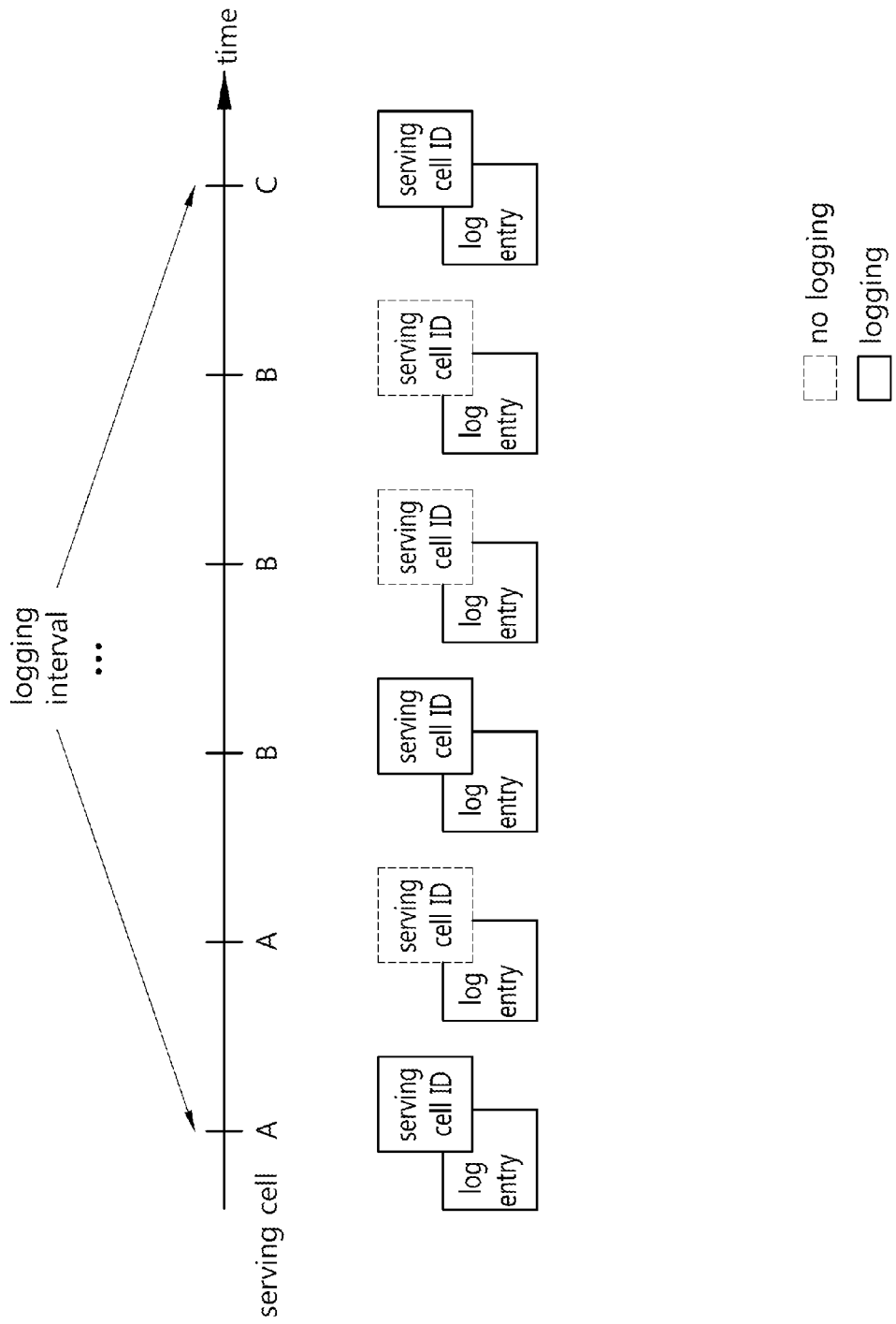
FIG. 8 is a view illustrating an example of a method of logging measurement information according to an embodiment of the present invention.

FIG. 8 is a view illustrating an example of a method of logging measurement information according to an embodiment of the present invention.

A UE compares a previous logging entry with a current logging entry, and only when the serving cell is changed, may include a current serving cell identifier in the logging entry.

For example, assume that the serving cell of the UE is changed in the order of cell A→cell B→cell C. The UE may be aware of the serving cell changing based on the serving cell identifier (e.g., GCI or PCI). When the serving cell varies, the UE may include the serving cell identifier in the corresponding log entry.

The UE may compare the previous logging entry with the current logging entry and may include changed PLMN information in the logged measurement when the PLMN is changed. If the comparison between the two logging entries shows that the PLMN is the same, the PLMN information is not included in the later logging entry. For example, if the PLMN is changed, GCI is used as a serving cell identifier, and if the PLMN remains the same, PCI is used as the serving cell identifier.

The UE may selectively log the neighboring cell information. For this purpose, one of the following methods may be used:

(1) among measured neighboring cells, some with quality of more than a threshold value subject only the cell identifying information (frequency and/or cell identifier) to logging, but not for the cell quality values. The neighboring cells with quality of the threshold value or less subject the cell identifying information and cell quality values to logging. At this time, the threshold value may be set depending on the frequency of the neighboring cell or RAT type of the neighboring cell or may be set in advance.

(2) no logging is done on neighboring cells whose quality is more than the threshold value among measured neighboring cells, while the cell identifying information and cell quality values are subjected to logging only on neighboring cells with quality of the threshold value or less.

As a reference to make comparison between quality values, methods may be used that satisfy one of 1) RSRP condition applied (i.e., RSRP of measurement cell>threshold value), 2) RSRQ condition applied (i.e., RSRQ of measurement cell>threshold value), 3) both RSRP and RSRQ applied (i.e., RSRP of measurement cell>threshold value 1 and RSRQ of measurement cell>threshold value 2), and 4) RSRP or RSRQ. Which method is to be used may be set or predefined by the network.

According to the PLMN set by the network, logging may be done selectively. The network may inform the UE of one or more PLMNs performing logging (this is referred to as a 'logging PLMN list') by using the measurement configuration. In case the logging PLMN list is set, the UE initiates logging only when the following conditions are met:

in case the PLMN currently registered by the UE belongs to the logging PLMN list the PLMN broadcast by the serving cell of the UE belongs to the logging PLMN list.

Through the logging PLMN configuration, the network may enable the UE to perform logging even in VPLMN and to report the stored log.

Figure 9:
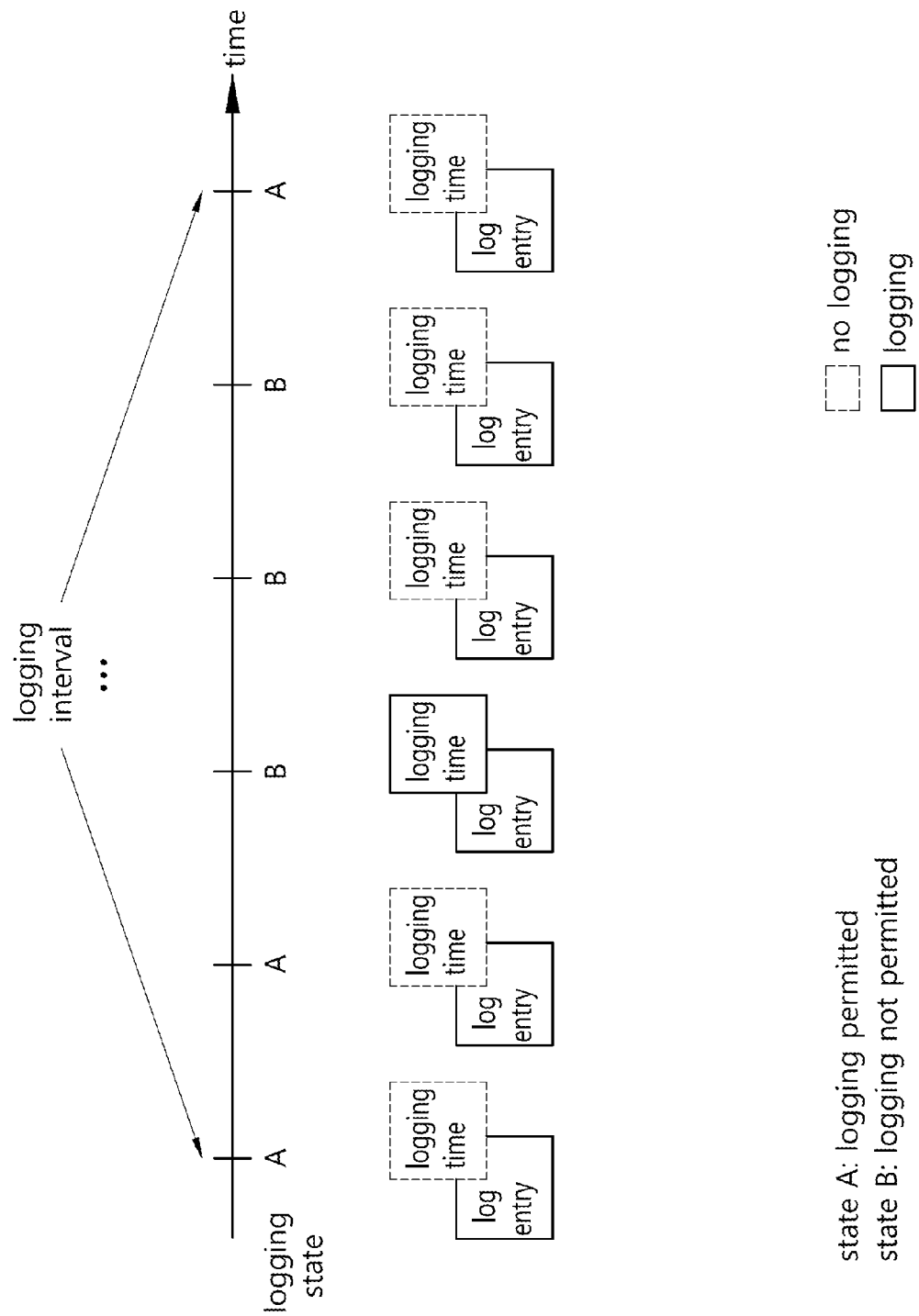
FIG. 9 is a view illustrating an example of a method of logging measurement information according to another embodiment of the present invention.

FIG. 9 is a view illustrating an example of a method of logging measurement information according to another embodiment of the present invention.

Rather than recording the logging time whenever the logging is performed, the UE may include the logging time in the log entry when at least one of the following conditions is met:

when a logging area is set, and the UE which has been off the logging area is back in the logging area, then tries logging, when the UE tries logging for the first time since shifting from the RRC connection mode to the RRC idle mode, when the UE which is in the RRC idle mode and has been off the camped normally state enters back into the camped normally state and tries logging, when the UE camping on an RAT other than an RAT where the logging configuration is received comes back into the RAT where the logging configuration is received and tries logging, or when the UE that has been off the logging PLMN roams back into the logging PLMN.

If the UE is configured to perform logging based on an event, the UE may record the logging time at every moment the logging is performed.

The logging time may be an absolute time or a relative time that represents a time gap between a reference time and a time that the logging is done.

Figure 10:
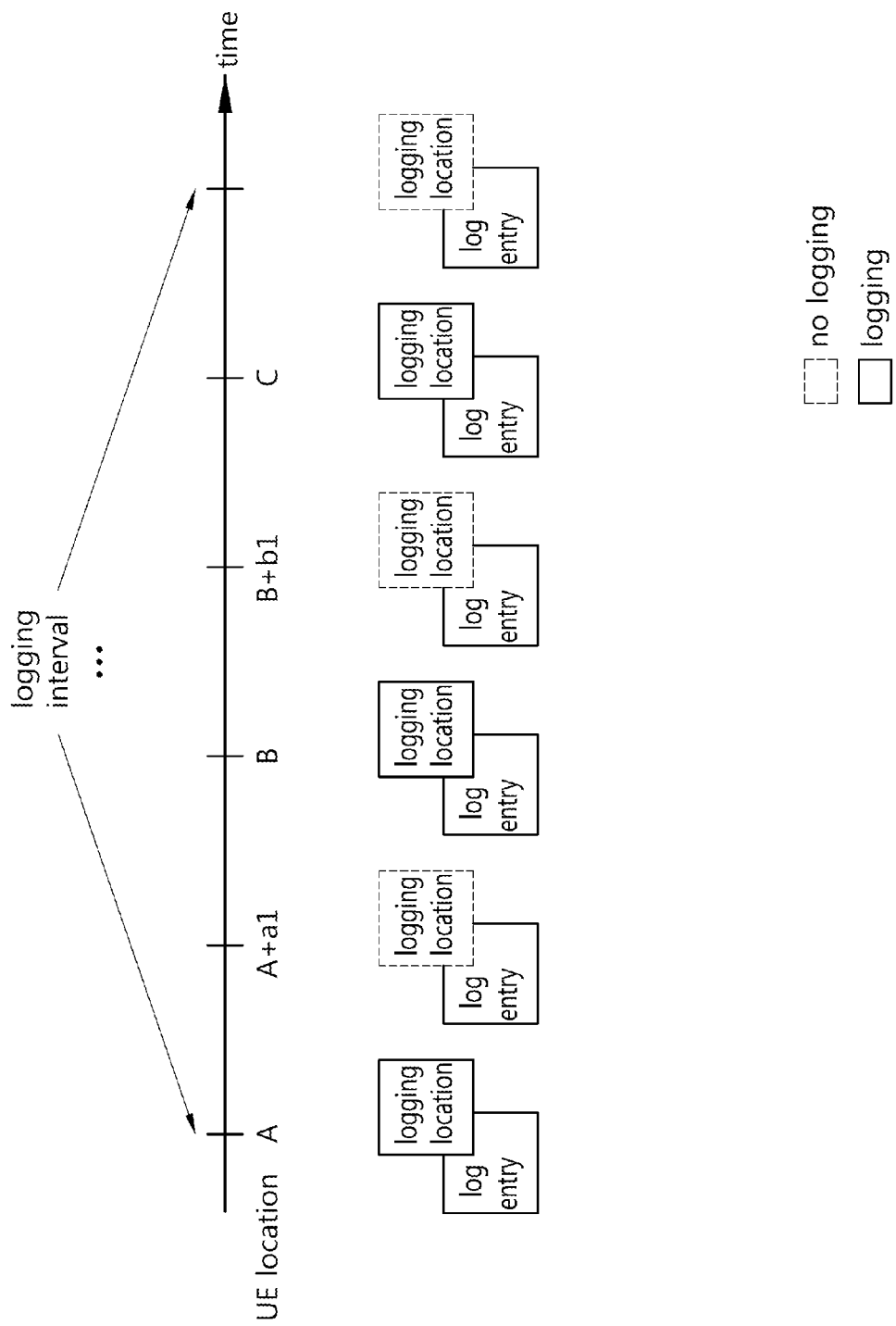
FIG. 10 is a view illustrating an example of a method of logging measurement information according to still another embodiment of the present invention.

FIG. 10 is a view illustrating an example of a method of logging measurement information according to still another embodiment of the present invention.

A logging location may be selectively logged. The network sets a threshold value to record a logging location in the UE. The UE compares a logging location to be included in the current log entry with a logging location of the previous log entry. Only when a difference between the two logging locations (i.e., distance) is larger than the threshold value, the logging location may be included in the current log entry.

For example, if the distance between location A and location A+a1 is smaller than the threshold value, the logging location is not included in the log entry. If the distance between location A and location B is larger than the threshold value, the logging location is included in the log entry. If the distance between location B and location B+b1 is smaller than the threshold value, the logging location is not included in the log entry.

The network may set, to the UE, areas where logging is prohibited. The logging-prohibited areas may be represented as a cell list, a tracking list, or a location area list. In the logging-prohibited areas, the UE terminates logging. The UE may resume logging upon departing from the logging-prohibited areas.

Although in the above-described embodiments, the UE selectively performs logging in the logging stage, as an example, the embodiments may be applicable to configuring a log reporting message. For example, the logged measurement is included in the information response. At this time, when the logged measurement is included in the information response, with the logged measurement configured the same way as the existing one, what is the log entry may be selectively included.

The UE reports information meaningful or necessary for the network among the logging targets, but does not report/log information that is not meaningful or necessary for the network. The memory necessary for storing the logged measurement may be reduced. Further, the amount of wireless resources necessary for transmitting the logged measurement may be decreased.

Figure 11:
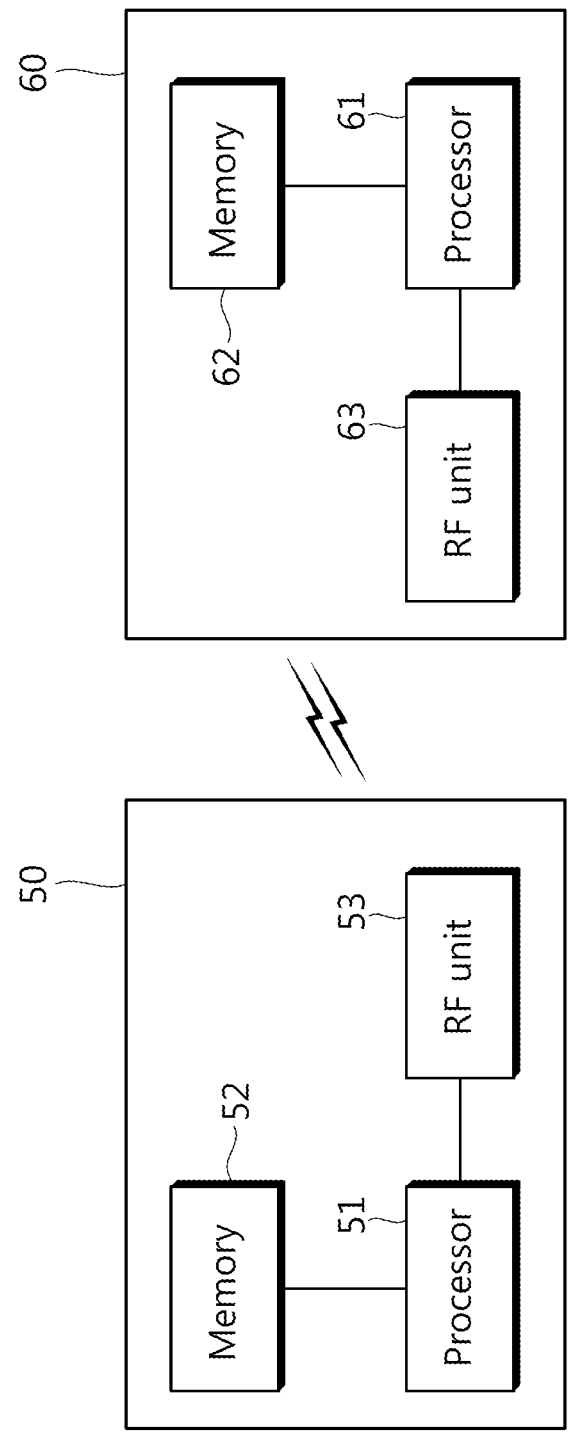
FIG. 11 is a block diagram illustrating a wireless communication system in which an embodiment of the present invention is implemented.

FIG. 11 is a block diagram illustrating a wireless communication system in which an embodiment of the present invention is implemented.

A base station 50 includes a processor 51, a memory 52, and an RF (Radio Frequency) unit 53. The memory 52 is connected to the processor 51 and stores various pieces of information to drive the processor 51. The RF unit 53 is connected to the processor 51 and transmits and/or receives wireless signals. The processor 51 implements the suggested functions, procedures, and/or methods. In the embodiments described above in connection with FIGS. 8 to 10, the operation of the base station 50 may be implemented by the processor 51.

A UE 60 includes a processor 61, a memory 62, and an RF unit 63. The memory 62 is connected to the processor 61 and stores various pieces of information to drive the processor 61. The RF unit 63 is connected to the processor 61 and transmits and/or receives wireless signals. The processor 61 implements the suggested functions, procedures, and/or methods. The operation of the UE in the embodiments described above in connection with FIGS. 8 to 10 may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting a logged measurement in a wireless communication system, the method comprising:
receiving, by a user equipment, a measurement configuration;
selecting, by the user equipment, a serving cell identifier, a neighboring cell identifier, and a neighboring cell measurement result, to be logged in each log entry of a measurement report based on the measurement configuration;
reporting, by the user equipment, the measurement report to a base station; and
comparing the neighboring cell measurement result to a predetermined threshold,
wherein, when a serving cell of the user equipment is changed, the serving cell identifier is included in a corresponding log entry,
wherein, at a first time when the neighboring cell measurement result is less than the predetermined threshold, both of the neighboring cell identifier and the neighboring cell measurement result are included in the corresponding log entry,
wherein, at a second time when the neighboring cell measurement result is greater than the predetermined threshold, only the neighboring cell identifier except for the neighboring cell measurement result is included in the corresponding log entry, and
wherein the predetermined threshold is determined based on a radio access technology of the neighboring cell.

2. The method of claim 1, wherein, when a specific event occurs, the logging time is included in a corresponding log entry.

3. The method of claim 1, wherein, when a distance between a current location and a logging location included in a previous log entry is larger than a threshold value, the current location is included as the logging location in a corresponding log entry.

4. The method of claim 1, wherein the measurements are logged in a Radio Resource Control (RRC) idle mode.

5. The method of claim 4, wherein the measurement configuration is a Minimization of Drive Tests (MDT) configuration for MDT measurement.

6. The method of claim 5, further comprising:
starting a validity timer upon receiving the measurement configuration,
wherein, while the validity timer is running, the user equipment is in the RRC idle mode logs the measurements based on the MDT configuration to collect the logged measurement.

7. The method of claim 6, further comprising, when the validity timer expires, discarding the MDT configuration while keeping the logged measurement.

8. The method of claim 7, further comprising:
entering, by the user equipment, into an RRC connection mode; and
transmitting, by the user equipment, a logging indicator indicating an availability of the logged measurement to the base station.

9. A wireless device configured for reporting a logged measurement in a wireless communication system, the wireless device comprising:
a radio frequency unit configured to transmit and receive a radio signal; and
a processor operably connected to the radio frequency unit and configured to:
receive a measurement configuration;
select, by the user equipment, a serving cell identifier, a neighboring cell identifier, and a neighboring cell measurement result, to be logged in each log entry of a measurement report based on the measurement configuration;
report the measurement report to a base station; and
compare the neighboring cell measurement result to a predetermined threshold,
wherein, when a serving cell of the user equipment is changed, the serving cell identifier is included in a corresponding log entry,
wherein, at a first time when the neighboring cell measurement result is less than the predetermined threshold, both of the neighboring cell identifier and the neighboring cell measurement result are included in the corresponding log entry,
wherein, at a second time when the neighboring cell measurement result is greater than the predetermined threshold, only the neighboring cell identifier except for the neighboring cell measurement result is included in the corresponding log entry, and
wherein the predetermined threshold is determined based on a radio access technology of the neighboring cell.

10. The wireless device of claim 9, wherein, when a specific event occurs, the logging time is included in a corresponding log entry.

11. The wireless device of claim 9, wherein, when a distance between a current location and a logging location included in a previous log entry is larger than a threshold value, the current location is included as the logging location in a corresponding log entry.

* * * * *